(12) United States Patent
Guduru

(10) Patent No.: US 9,882,635 B2
(45) Date of Patent: *Jan. 30, 2018

(54) REROUTING BUS DATA SIGNALS FROM FAULTY SIGNAL CARRIERS TO EXISTING HEALTHY SIGNAL CARRIERS

(71) Applicant: International Business Machines Corporation, Armonk, NY (US)

(72) Inventor: Suresh Guduru, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,592

(22) Filed: Sep. 29, 2015

(65) Prior Publication Data

US 2016/0380694 A1 Dec. 29, 2016

Related U.S. Application Data

(63) Continuation of application No. 14/749,853, filed on Jun. 25, 2015.

(51) Int. Cl.
*H04B 10/038* (2013.01)
*H04L 12/707* (2013.01)
(Continued)

(52) U.S. Cl.
CPC .......... *H04B 10/038* (2013.01); *H04L 12/40* (2013.01); *H04L 12/4625* (2013.01);
(Continued)

(58) Field of Classification Search
CPC .......................... H04B 10/038; H04L 41/0668
(Continued)

(56) References Cited

U.S. PATENT DOCUMENTS 6,973,517 B1 * 12/2005 Golden ................... G06F 15/16
710/104
7,730,376 B2 6/2010 Das Sharma
(Continued)

OTHER PUBLICATIONS

Dobson, "The role of PCI Express in communications control plane applications," PICMG Systems and Technology, Published Apr. 7, 2008, © MMXV PICMG Systems and Technology—An OpenSystems Media Publication Last updated: Sat, Feb. 28, 2015 07:32:30+0000.
(Continued)

*Primary Examiner* — Mang Yeung
*Assistant Examiner* — Peter G Solinsky
(74) *Attorney, Agent, or Firm* — Joseph W. Cruz

(57) ABSTRACT

A first set of signal carriers of a plurality of signal carriers may be determined to be faulty. The first set of signal carriers may be for transmitting a first set of respective lane signals of a plurality of lane signals. A second set of signal carriers of the plurality of signal carriers may be identified as not faulty. The second set of signal carriers may be for transmitting a second set of lane signals of the plurality of lane signals. Based on the determining and identifying, one or more of the first set of lane signals may be routed from the first set of signal carriers through a first subset of the second set of signal carriers, the routing of the one or more of the first set of lane signals may cause a bandwidth capacity to increase to a highest available bandwidth.

7 Claims, 8 Drawing Sheets

(51) Int. Cl.
    *H04Q 11/00*    (2006.01)
    *H04L 12/40*    (2006.01)
    *H04L 12/703*   (2013.01)
    *H04L 12/24*    (2006.01)
    *H04L 12/46*    (2006.01)

(52) U.S. Cl.
    CPC ...... *H04L 41/0659* (2013.01); *H04L 41/0896* (2013.01); *H04L 45/22* (2013.01); *H04L 45/28* (2013.01); *H04Q 11/0066* (2013.01); *H04Q 2011/0081* (2013.01)

(58) Field of Classification Search
    USPC ....................................................... 370/225
    See application file for complete search history.

(56) References Cited

U.S. PATENT DOCUMENTS

| | | | |
|---|---|---|---|
| 9,141,505 | B1 | 9/2015 | Crow et al. |
| 2008/0126814 | A1* | 5/2008 | Burkland ............ G06F 13/4081 713/300 |
| 2009/0052903 | A1* | 2/2009 | Mussatt ............ G06F 13/4045 398/135 |
| 2010/0053180 | A1* | 3/2010 | Ostiguy ................ G06F 21/84 345/531 |
| 2011/0320703 | A1* | 12/2011 | Craddock ............... G06F 13/16 711/108 |
| 2012/0144087 | A1* | 6/2012 | Buckland ............ G06F 13/4068 710/316 |
| 2012/0144230 | A1* | 6/2012 | Buckland ............ G06F 13/4022 714/4.5 |
| 2012/0309421 | A1* | 12/2012 | Nabbefeld ............. G01C 21/32 455/456.1 |
| 2014/0082251 | A1 | 3/2014 | Li |
| 2014/0286634 | A1 | 9/2014 | Tsuiki |
| 2015/0180790 | A1* | 6/2015 | Rimmer ................. H04L 47/39 370/368 |
| 2015/0278040 | A1* | 10/2015 | Sikkink ............... G06F 11/2002 714/5.1 |
| 2015/0324268 | A1* | 11/2015 | Du ...................... G06F 11/3027 714/43 |
| 2016/0147628 | A1* | 5/2016 | Arroyo ............... G06F 11/2247 714/43 |
| 2016/0182154 | A1 | 6/2016 | Fang et al. |
| 2017/0068630 | A1* | 3/2017 | Iskandar ............. G06F 13/4022 |
| 2017/0091108 | A1* | 3/2017 | Arellano ............. G06F 12/0888 |

OTHER PUBLICATIONS

Guduru, "Rerouting Bus Data Signals From Faulty Signal Carriers to Existing Healthy Signal Carriers," U.S. Appl. No. 14/749,853, filed Jun. 25, 2015.

List of IBM Patents and Patent Applications Treated as Related, dated Sep. 25, 2015, 2 pages.

* cited by examiner

| PCIe Lane Signal(s) | Optical Fibers Carrying the Signal(s) | PCIe Link Width |
|---|---|---|
| Lane 0 | Fiber(s) 1 | x1 |
| Lane 1 | Fiber(s) 2 | x2 |
| Lane 2 | Fiber(s) 3 | x2 |
| Lane 3 | Fiber(s) 4 | x4 |
| Lane 4 | Fiber(s) 5 | x4 |
| Lane 5 | Fiber(s) 6 | x4 |
| Lane 6 | Fiber(s) 7 | x4 |
| Lane 7 | Fiber(s) 8 | x8 |

FIG. 1A

| PCIe Lane Signal(s) | Faulty Optical Fibers | Resulting PCIe Link Width |
|---|---|---|
| Lane 0 | Fiber(s) 1 | x0 (Link Down) |
| Lane 1 | Fiber(s) 2 | x1 |
| Lane 2 | Fiber(s) 3 | x2 |
| Lane 3 | Fiber(s) 4 | x2 |
| Lane 4 | Fiber(s) 5 | x4 |
| Lane 5 | Fiber(s) 6 | x4 |
| Lane 6 | Fiber(s) 7 | x4 |
| Lane 7 | Fiber(s) 8 | x4 |

FIG. 1B

| Pcie lane signals | Demux val | Mux val | Optical fibers |
|---|---|---|---|
| Lane 0 | 3 | 0 | Fiber(s) 3 |
| Lane 1 | 4 | 1 | Fiber(s) 4 |
| Lane 2 | 6 | 2 | Fiber(s) 6 |
| Lane 3 | 7 | 3 | Fiber(s) 7 |
| Lane 4 | | | Fiber(s) 1 |
| Lane 5 | | | Fiber(s) 2 |
| Lane 6 | | | Fiber(s) 5 |
| Lane 7 | | | Fiber(s) 8 |

Faulty fibers: Fiber(s) 1, Fiber(s) 2, Fiber(s) 5, Fiber(s) 8

FIG. 7A

US 9,882,635 B2

REROUTING BUS DATA SIGNALS FROM FAULTY SIGNAL CARRIERS TO EXISTING HEALTHY SIGNAL CARRIERS

BACKGROUND

This disclosure relates generally to input/output (I/O) buses used to interconnect peripheral devices in computing systems, and more specifically, to re-routing lane signals from faulty signal carriers to existing and healthy signal carriers.

A Peripheral Component Interconnect Express (PCIe) bus is a high performance I/O standard serial bus that interconnects endpoints. A point-to-point physical connection between two PCIe endpoints (e.g., Ethernet, USB, graphics devices, etc.) is called a link. A link is used to transfer I/O data serially in packets. The PCIe link may include one or more signal lines called lanes. A single lane may include two pairs of signal carriers (e.g., fiber, wire, etc.) for transmitting respective differentiating lane signals. One lane signal (or differentiating pair of lane signals) may be utilized for receiving data and one differential pair of lane signals may be utilized for transmitting data. Each differential pair of lane signals may be capable of transmitting or receiving data one bit at a time. A link consisting of one lane is called an x1 link, and has a link width of one lane. A link consisting of two lanes is called an x2 link, and has a link width of two lanes. PCIe specifications may allow for link widths of x1, x2, x4, x8, and x16 lanes. During a process called "link training," two peripheral devices may negotiate link parameters. For example, the devices may determine link width capacity (e.g., bandwidth), link speed, lane polarity, etc.

SUMMARY

Various embodiments of the present disclosure may include a computer-implemented method, a system, and a computer program product for routing lane signals from faulty signal carriers to healthy signal carriers to increase to a highest available bandwidth. A first set of signal carriers of a plurality of signal carriers may be determined to be faulty. The first set of signal carriers may be for transmitting a first set of respective lane signals of a plurality of lane signals. The plurality of signal carriers may form a plurality of sequentially ordered lanes. The plurality of lanes may comprise a link for use in intercommunication between two or more endpoints of a computing device. A second set of signal carriers of the plurality of signal carriers may be identified as not faulty. The second set of signal carriers may be for transmitting a second set of lane signals of the plurality of lane signals. Based on the determining and identifying, one or more of the first set of lane signals may be routed from the first set of signal carriers through a first subset of the second set of signal carriers, the routing of the one or more of the first set of lane signals may cause a bandwidth capacity to increase to a highest available bandwidth.

BRIEF DESCRIPTION OF THE DRAWINGS

FIG. 1A is an example illustration of a healthy PCIe environment.

FIG. 1B is an example illustration of the PCIe environment of FIG. 1A and what the resulting link width would be if particular fibers became faulty, according to embodiments.

FIG. 7A is an illustration of a faulty PCIe environment, and how the configuration of each signal may occur after various faults have been detected, according to embodiments.

Figure 2:
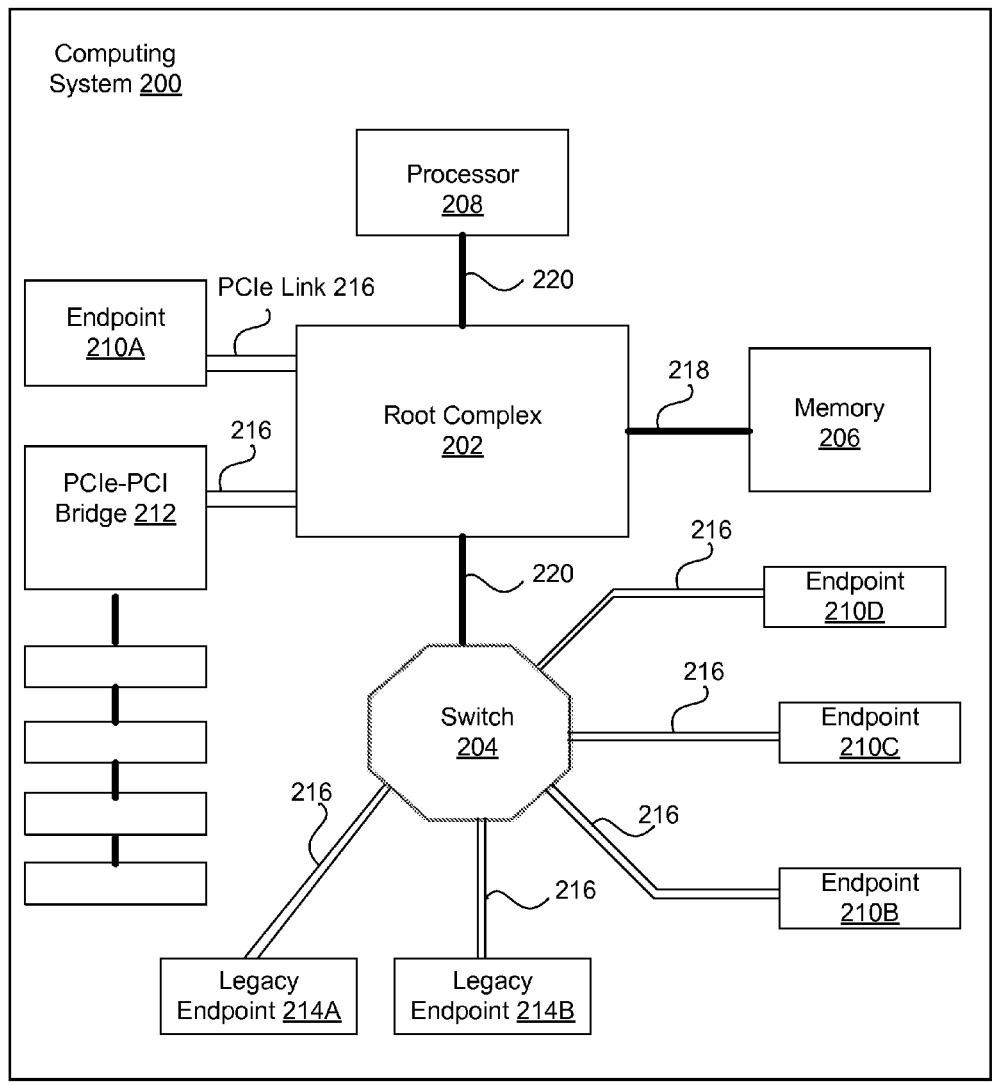
FIG. 2 is a block diagram of an example computing system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to I/O buses used to interconnect peripheral devices in computing systems, and more specifically, to re-routing lane signals from faulty signal carriers to existing and healthy signal carriers. While the present disclosure is not necessarily limited to such application, various aspects of the disclosure may be appreciated through a discussion of various examples using this context.

In some examples, bus systems (e.g., PCIe) may utilize optical fiber as the signal carrier (i.e., medium of data transfer) between endpoints. Fiber or other mediums, however, may be fragile and consequently be subject to fault or breakage due to its physical structure. If a fiber is faulty (e.g., the fiber is severely bent or breaks), the corresponding lane signal in which the fiber houses may not function and parameter setup (e.g., link training) may either operate at a degraded link width or even fail. For example, FIGS. 1A and 1B illustrate how even a single faulty fiber may cause a severely degraded link width. FIG. 1A is an example illustration of a healthy PCIe environment, according to embodiments. As illustrated in FIG. 1A, there may be 8 PCIe lane signals (Lanes 0-7) within a link, 8 healthy corresponding optical fibers (or 8 pairs of fibers), and a resulting x8 PCIe link width.

FIG. 1B is an example illustration of the PCIe environment of FIG. 1A and what the resulting link width would be if particular fibers became faulty, according to embodiments. FIG. 1B illustrates that the lower the fiber number that becomes faulty, the lower the link width will be. For example, if fiber 8 became faulty, the resulting PCIe link width would be x4. However, if a lower numbered fiber, fiber 2 became faulty, the resulting PCIe link width would decrease to an even lower link width capacity at x1. Further, if Fiber 1 has become faulty, the resulting PCIe link width will be x0 (i.e., a particular link will be down and not be utilized at all), even though there are still 7 existing and healthy fibers in good condition (fibers 2, 3, 4, 5, 6, 7, and 8). Because PCIe specifications may require lanes to be used sequentially and may only allow for link widths of x1, x2, x4, x8, and x16, any damage to any single fiber may cause the link width to decrease by half of its original link width. Therefore, the link width that was operating at x1 in FIG. 1A, will now decrease by half to the next lowest PCIe specification, which is x0 (i.e., the entire link is unusable) as shown in FIG. 1B if fiber 2 becomes faulty. This may cause the system to run inefficiently (e.g., decreased bandwidth), as the other existing fibers are not utilized. Accordingly, embodiments of the present disclosure are directed towards determining existing and healthy signal carriers after a fault such that the corresponding lane signals can be re-routed from the faulty (e.g., unhealthy) signal carriers to existing healthy signal carriers so as to increase link width and consequently system bandwidth. For example, using FIG. 1A and FIG. 1B, if fiber 1 becomes faulty, lane 0's signals may be rerouted from fiber 1 to fiber 2 to maintain the X1 link width, as opposed to having the entire link become unusable (i.e., x0).

FIG. 2 is a block diagram of an example computing system, according to embodiments. The computing system 200 may include a processor (CPU) 208, one or more endpoints 210A, 210B, 210C, 210D, a root complex 202, a memory 206, a switch 204, a PCIe-PCI(x) bridge 212, legacy endpoints 214A and 214B, all of which are communicatively coupled, directly or indirectly, for inter-component communication via PCIe links 216, a memory bus 218, and system buses 220.

In various embodiments, the computing system 200 is a multi-user mainframe computer system, a single-user system, or a server computer or similar device that has little or no direct user interface, but receives requests from other computer systems (clients). In other embodiments, the computing system 200 may be implemented as a desktop computer, portable computer, laptop or notebook computer, tablet computer, pocket computer, telephone, smart phone, or any other suitable type of electronic device.

The computing system 200 may include one or more general-purpose programmable central processing units (CPUs), herein generically referred to as the processor 208. In an embodiment, the computing system 200 may contain multiple processors; however, in another embodiment, the computing system 200 may alternatively be a single CPU device. Each processor 208 executes instructions stored in the memory 206.

Although the computing system 200 shown in FIG. 2 illustrates particular bus structures (PCIe link 216, memory bus 218, and system bus 220) providing a direct communication path among the processor 208, the memory 206, the endpoints 210, the root complex 202, the legacy endpoints 214, switch 204, and the PCIe-PCI bridge 212; in alternative embodiments the computing system 200 may include different buses or communication paths, which may be arranged in any of various forms, such as point-to-point links in hierarchical, star or web configurations, multiple hierarchical buses, parallel and redundant paths, or any other appropriate type of configuration.

In an embodiment, the memory 206 may include a random-access semiconductor memory, storage device, or storage medium (either volatile or non-volatile) for storing or encoding data and programs. In another embodiment, the memory 206 represents the entire virtual memory of the computing system 200, and may also include the virtual memory of other computer systems coupled to the computing system 200 or connected via a network. The memory 206 may be a single monolithic entity, but in other embodiments the memory 206 may include a hierarchy of caches and other memory devices. For example, memory may exist in multiple levels of caches, and these caches may be further divided by function, so that one cache holds instructions while another holds non-instruction data, which is used by the processor 208. Memory 206 may be further distributed and associated with different CPUs or sets of CPUs, as is known in any various so-called non-uniform memory access (NUMA) computer architectures. The memory 206 may store all or a portion of components and data configured to, for example, detect faulty signal carriers, as further discussed in FIG. 5. In embodiments, the components and data may include instructions or statements that execute on the processor 308 or instructions or statements that are interpreted by instructions or statements that execute the processor 308 to carry out the functions as further described below. In another embodiment, the components and data may be implemented in hardware via semiconductor devices, chips, logical gates, circuits, circuit cards, and/or other physical hardware devices in lieu of, or in addition to, a processor-based system.

In various embodiments, a root complex 202 (e.g., Central Electronics Complex (CEC)) component generates transaction requests on behalf of the processor 208. In response to processor 208 commands, the root complex 202 may generate configuration, memory, and I/O requests. The root complex 202 may transmit and receive packets of data to or from corresponding ports and forward the packets to the memory 206 or processor 208. In some embodiments, the root complex 202 may include multiple ports in which packets of data may be routed from one port to another (e.g., peer-to-peer transactions). In various embodiments, the root complex 202 may be utilized to implement central system resources (e.g., hot plug controllers, power management controller, interrupt controller, error detection and correction logic, etc.).

In embodiments, a switch 204 may route bus traffic and establishes a point-to-point connection between any two devices (e.g., endpoint 210B and endpoint 210C). The switch 204 may forward data packets in various manners. For example, data may be forwarded using address-based routing, ID routing, or implicit routing. The switches 204 may forward all transactions from ingress ports to egress ports. In embodiments, the switch 204 may include ports to determine a priority with which to forward data packets from ingress ports to egress ports.

In embodiments, endpoints 210 (210A, 210B, 210C, 210D) may be the actual peripheral devices that request or complete transactions. For example, the endpoints 210 may be Ethernet, USB, or graphics cards. In some embodiments, the computing system 200 may include legacy endpoints 214A and 214B. Legacy endpoints 214 may support I/O transactions and locked transaction semantics. In some embodiments, legacy endpoints 214 may support legacy interrupt generation using message requests (e.g., interrupt-capable legacy devices).

In embodiments, the PCIe-PCI(x) bridge 212 is a bridge between PCIe fabric and a PCI or PCI-X hierarchy. Accordingly, the PCIe-PCIx bridge 212 may translate PCIe signals back into Peripheral Component Interconnect (PCI) signals or Peripheral Component Interconnect Extended (PCIx) signals. This may effectively allow PCIe or PCIx devices to coexist with PCIe devices within the same system.

FIG. 2 is intended to depict representative components of the computing system 200. Individual components, however, may have greater complexity than represented in FIG. 2. In FIG. 2, components other than or in addition to those shown may be present, and the number, type, and configuration of such components may vary. For example, the computing system 200 may include a display system for displaying information on a computing system monitor, a storage device (e.g., disk, USB drive, etc.), or network interface. The various program components illustrated in FIG. 2 may be implemented, in various embodiments, in a number of different ways, including using various computer applications, routines, components, programs, objects, modules, data structures etc., which may be referred to herein as "software," "computer programs," "firmware," or simply "programs."

Figure 3:
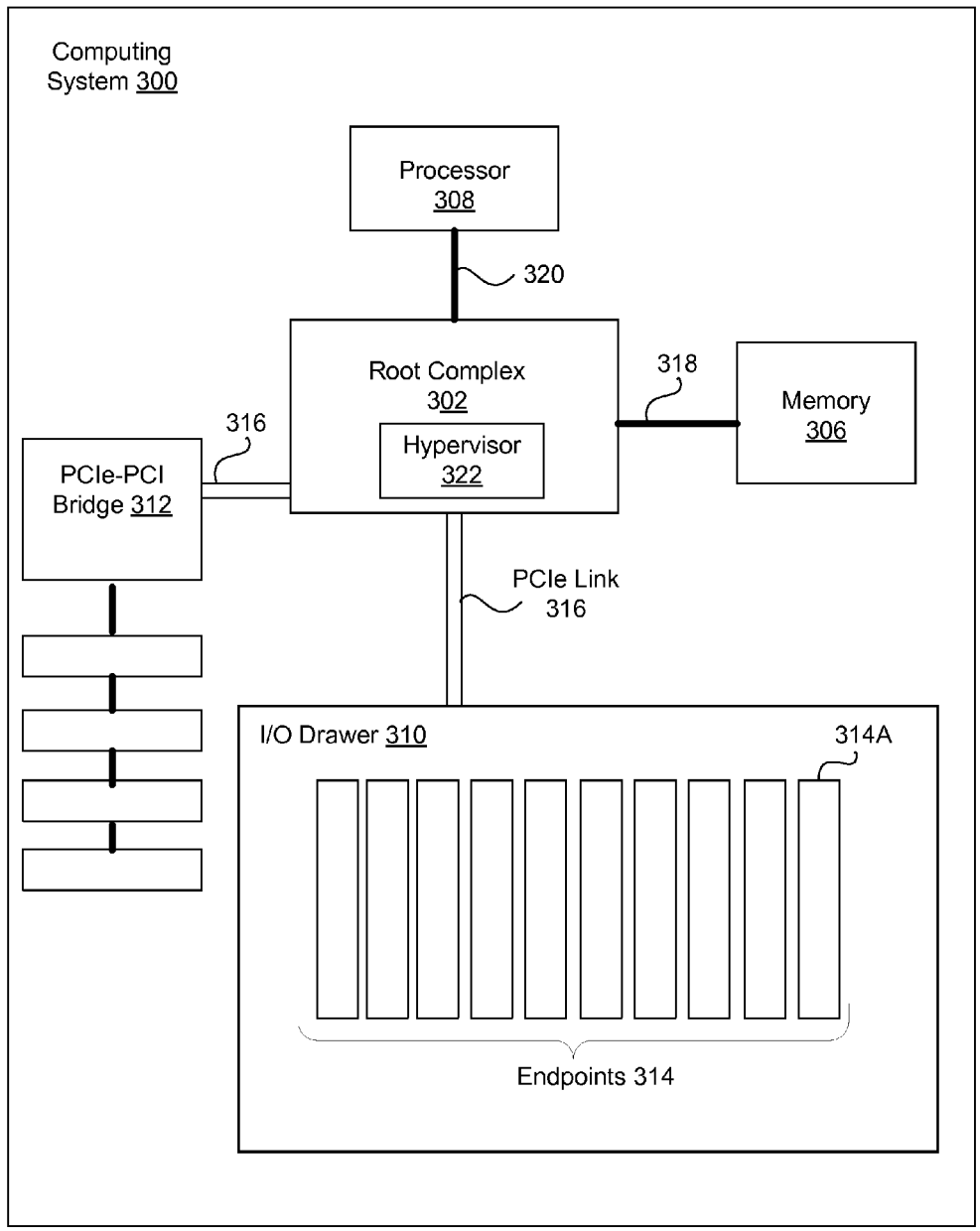
FIG. 3 is a block diagram of an example computing system, according to embodiments.

FIG. 3 is a block diagram of an example computing system 300, according to embodiments. The computing system 300 may include a processor 308, a root complex 302, a PCIe-PCI(x) bridge 312, memory 306, PCIe links 316, memory bus 318, system bus 320, and one or more input/output (I/O) drawers 310. The I/O drawers 310 may include multiple endpoints 314.

In some embodiments, as illustrated in FIG. 3, the root complex 302 may include a hypervisor 322. The hypervisor 322 may be a firmware program that performs I/O and memory management. In various embodiments, the hypervisor 322 may be responsible for configuring multiplexers and/or demultiplexers for routing lane signals from faulty signal carriers to healthy signal carriers, as described in more detail below. In some embodiments, the hypervisor 322 may further communicate with the fault detection module, as described in more detail below. In some embodiments, the hypervisor 322 may not necessarily configure the multiplexers and demultiplexers or communicate with the fault detection module, but other system firmware may be responsible for these operations.

In some embodiments, the computing system 300 may be a server system (e.g., enterprise server system). In embodiments, the I/O drawers 310 may be utilized to expand the I/O capabilities of servers. Accordingly, I/O drawers 310 may include several stacked I/O endpoints 314 for multiple tasks or application needs. In some embodiments, the I/O drawers 310 may include hot plug adapter slots to add, replace, or remove computing system 300 components while the computing system 300 is running. The I/O drawers 310 may also include hot swap disk bays to allow for removal of a drive without shutting the computing system 300 down. In some embodiments, the I/O drawers 310 may include a controller to receive or forward I/O requests.

Figure 4:
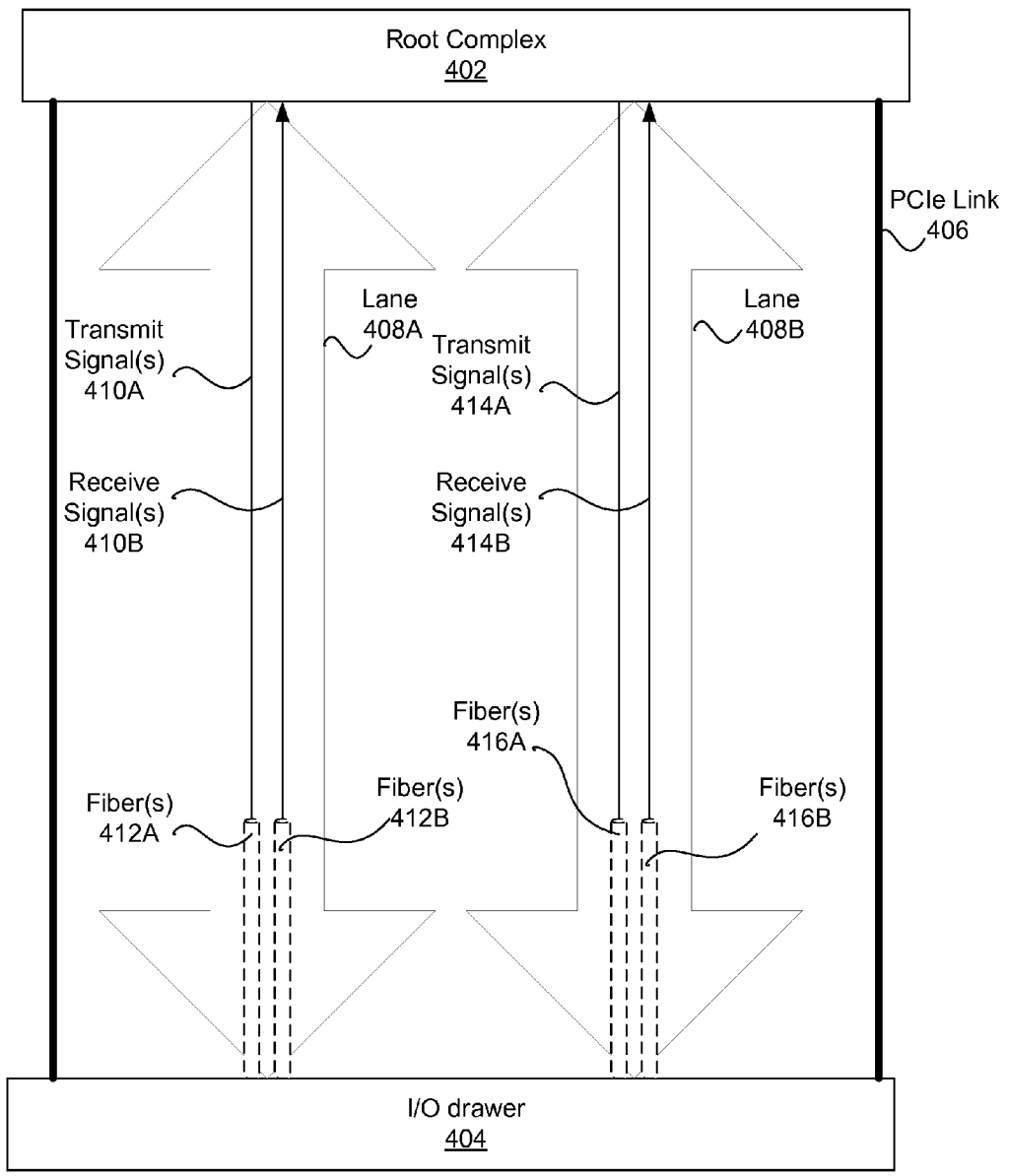
FIG. 4 is an example diagram of a PCIe link, according to embodiments.

FIG. 4 is an example diagram of a PCIe link, according to embodiments. The PCIe link 406 may be the point-to-point physical connection between two PCIe endpoints (e.g., root complex 402 and I/O drawer 404). Accordingly, data may be transferred through the PCIe link 406. The PCIe link 406 illustrated in FIG. 4 is an x2 PCIe link (link width of 2). Accordingly, the PCIe link 406 includes 2 lanes (lane 408A and 408B).

Each lane 408A and 408B may include one or more transmit signals (Tx) 410A and 414A for transmitting data, and one or more receive signals (Rx) 410B and 414B for receiving data. Examples of transmit signals 410 and receive signals 410B are voltages, light pulses, etc. These lane signals represent data transfer between the root complex 402 and the I/O drawer 404. Each of the lane signals include respective fibers (e.g., 412A, 412B, 416A, and 416B). For example, transmit signal 410A may be housed within fiber 412A, or receive signal 408B may be housed within fiber 416B. In an example illustration, for embodiments of the present disclosure, fiber 412A might become faulty or break. In embodiments, the corresponding lane 408A and its lane signals 410A and 410B may be re-routed to lane 408B such that the transmit and receive signals 410A and 410B will be housed within fibers 416A and 416B. The transmit and receive signals 414A and 414B may also be re-routed to a different lanes in embodiments. Re-routing is discussed in more detail below.

Figure 5:
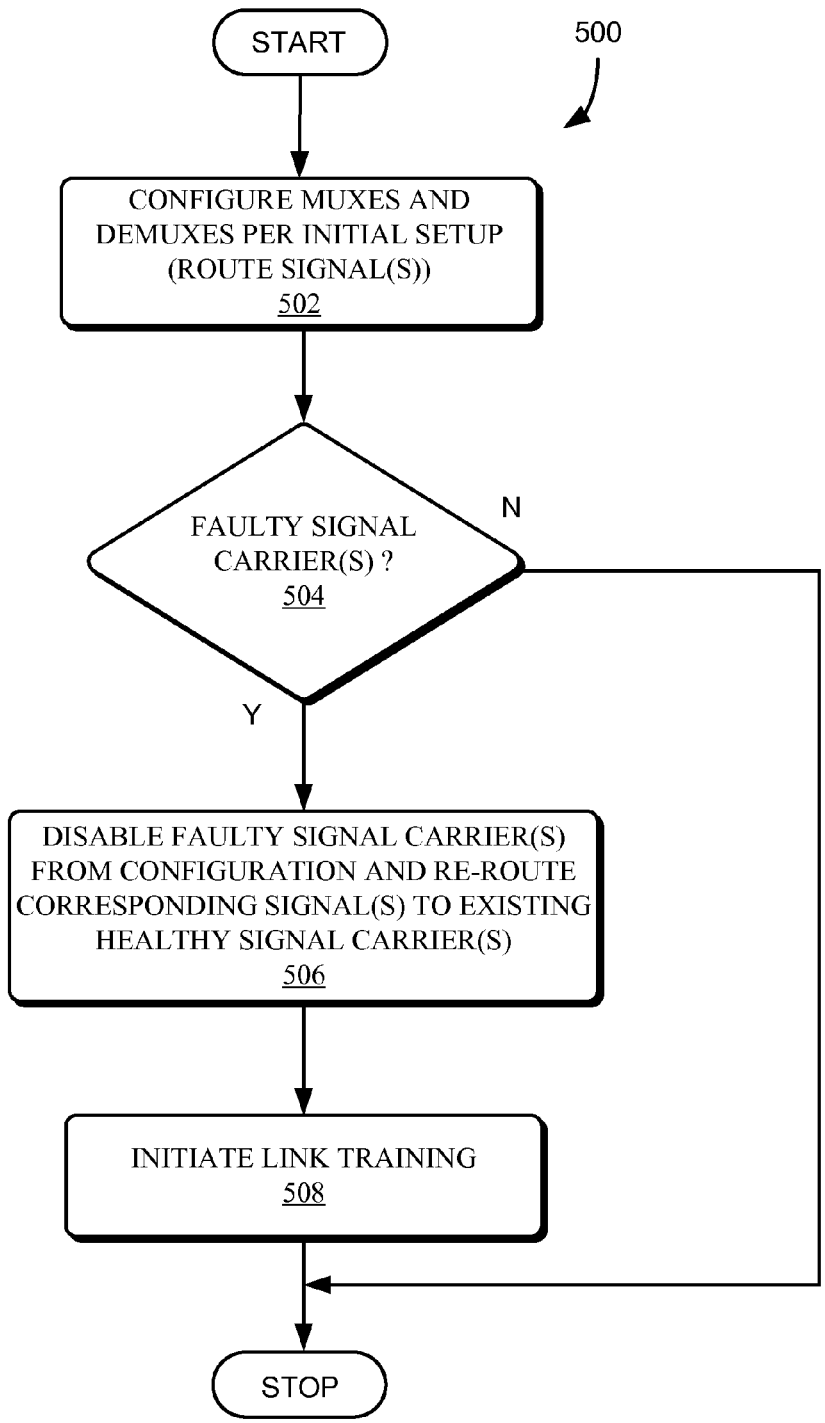
FIG. 5 is a flow diagram of an example process for detecting one or more faulty signal carriers and re-routing the respective signals accordingly.

FIG. 5 is a flow diagram of an example process 500 for detecting one or more faulty signal carriers and re-routing the respective signals accordingly. The process 500 may start when a configuration module performs operation 502 to configure the mux and demux (multiplexer and demultiplexer) default values. For example, lane 0 (i.e., a group of lane signals) may be initially routed to fiber 1 for initial setup using the demux and mux. Multiplexer and demultiplexer functions, as well as default values are described in more detail in FIGS. 6, 7A, and 7B below.

In operation 504, a determination may be made of whether there is a fault with one or more signal carriers. For example, a fault detection module may infer that an optical fiber that carries a lane signal is broken or is bent to a degree in which the lane signal is impaired. In an illustrative example, a fiber cable connector apparatus (e.g., CXP connector) at a receiving end may include a fault detection module (e.g., Active Optical Cable module) that detects when a voltage signal is lost or becomes degraded below a threshold. In these embodiments, a receiving end cable fiber connector may include a photodiode or other phototransducer to convert the optical signals into electrical signals. For example, a photodiode may be connected in series with a resistor and a voltage drop over the resistor may change in relation to the amount of light applied to the photodiode. Accordingly, a voltage threshold may be determined. The cable connector apparatus (e.g., the fiber connector 604 of FIG. 6) may be coupled to a cable that houses each of the signal carriers. The voltage threshold may be any suitable threshold for embodiments of the present disclosure. For example, the fault detection module may determine that there is a faulty fiber when an associated differential pair signal strength (e.g., Rx) falls below 0.1 volts, 0.5 volts, 0.7 volts, or any suitable voltage value. In these embodiments, each fiber (or group of fibers) in a cable may be associated with an identification number (e.g., ch. 1, ch. 2, etc.) and when a voltage loss is detected, the fault detection module may determine which identification number corresponds to the degraded lane signal. Accordingly, an inference may be made that the corresponding fiber is either broken or severely bent based on the lane signal strength. If there are no faulty signal carriers detected in operation 504, then the process may stop. If there are faulty signal carriers detected, then operation 506 may be performed.

In operation 506, consistent with some embodiments, a demultiplexer may disable or isolate the one or more faulty signal carriers from configuration and a multiplexer may re-route the corresponding signals to existing healthy signal carriers. For example, in a PCIe environment, if a first fiber becomes faulty, which initially corresponds to a first lane signal, then the first lane signal may be re-routed from the first fiber to a second fiber, leaving the first fiber disabled. Operation 506 is discussed in more detail below.

In operation 508, and in some embodiments, link training may be initiated after re-routing the lane signals from faulty signal carriers to healthy signal carriers (e.g., operation 506). In some examples, physical layer system parameters may be established during link training such as link width, lane polarity, link number, lane numbers, scrambler enabled or disabled, link speed, number of fast training sequences required, etc. In embodiments, link training may be initiated automatically as a result of a wakeup event from a low power mode, or due to an error condition that renders a lane inoperable. For example, in embodiments, each time a fiber is found to be faulty, a link training sequence may be initiated. In an example illustration, a faulty fiber may be discovered, causing the link width to degrade from x8, to x2. In embodiments, as soon as the fault is detected (operation 504) and corresponding lanes have been re-routed (operation 508), a link training session may be established to determine that a link width is now x4, instead of x2 due to process 500.

Figure 6:
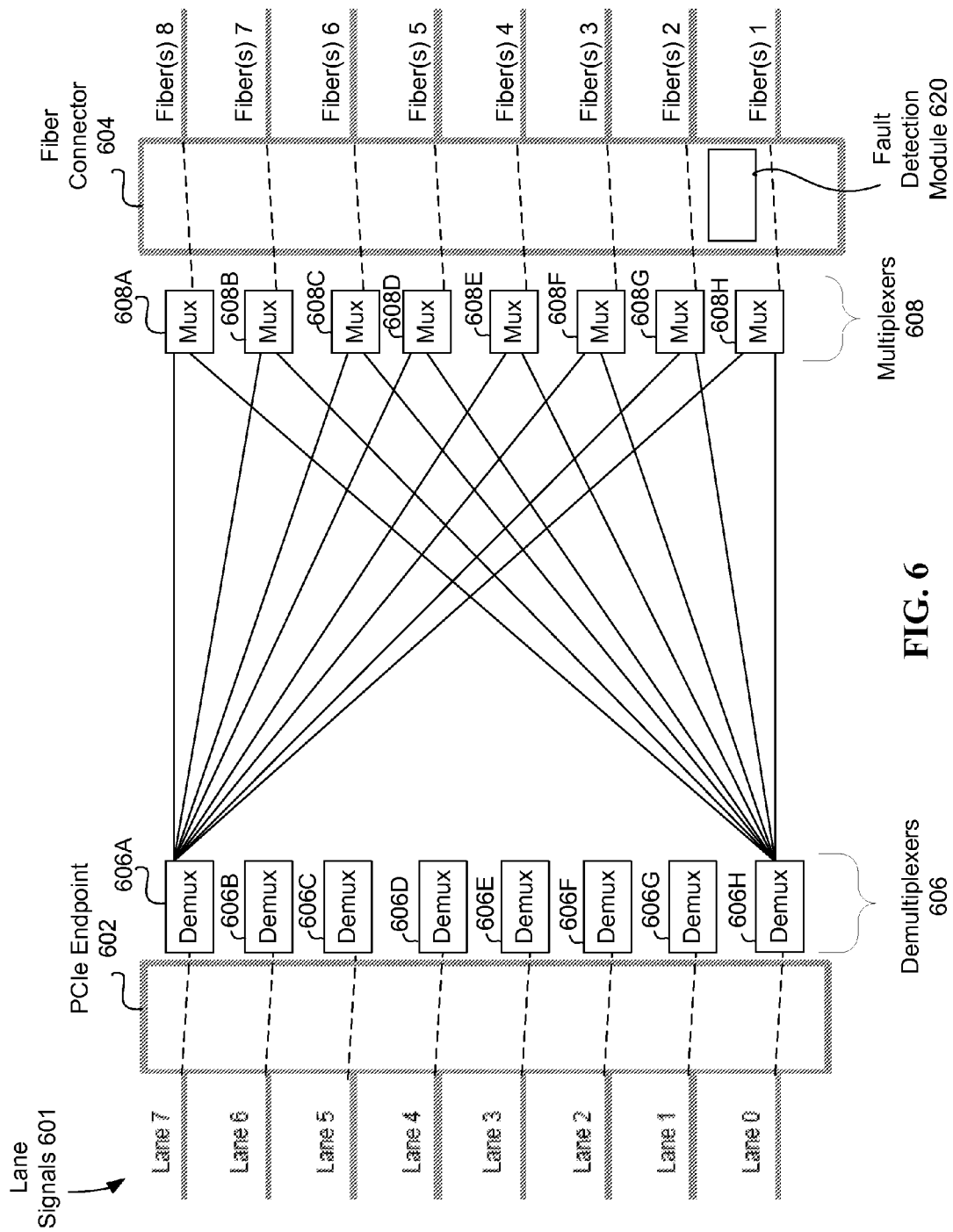
FIG. 6 is a block diagram of an illustration showing how lane signals may be re-routed from faulty signal carriers to existing healthy signal carriers, according to embodiments.

FIG. 6 is a block diagram of an illustration showing how lane signals may be re-routed from faulty signal carriers to existing healthy signal carriers, according to embodiments. In the illustration of FIG. 6, there is a PCIe endpoint 602, lane signals 601 (lanes 0-7), a set of demultiplexers 606 (606A, 606B, 606C, 606D, 606E, 606F, 606G, and 606H) that may route or re-route its corresponding lane signal(s) (e.g., demultiplexer 606A routing input lane 7) to a set of corresponding multiplexers 608 (608A, 608B, 608C, 608D, 608E, 608F, 608G, and 608H). The diagram of FIG. 6 also illustrates a fiber connector 604, and 8 individual fibers (or groups of fibers). The fiber connector 604 may include a fault detection module configured to detect whether one or more fibers are faulty, as described above. In some embodiments, the optical fibers 1-8 may correspond with PCIe link 216 or 316 shown in FIG. 2 and FIG. 3 respectively. FIG. 6 illustrates that each demultiplexer and multiplexer corresponds with respective lane signals and fibers. In the example of FIG. 6, the demultiplexers 606 may be 1 to 8 devices and the multiplexers 608 may be 8 to 1 devices. In FIG. 6, connecting lines (opened channels) are only shown from demultiplexers 606A and 606H for purposes of clarity. It should be understood that similar connecting lines from 606B, 606C, 606D, 606E, 606F, and 606G are included.

In an example illustration, Lane 7 may utilize Demux 606A to open potential channels to the other fibers, and Fiber(s) 8 may utilize Mux 608A to transmit a particular lane signal. According to some embodiments, the multiplexers 608 and/or the demultiplexers 606 may be housed within the fiber connector 604. In other embodiments, they may be housed within a separate chip, within a PCIe device, on a system planar, on a separate connector. In embodiments, when a fiber is found to be faulty, the fiber may be disabled from communication. In some embodiments, a switch within the set of multiplexers 608 or demultiplexers 606 may open in order to isolate the corresponding signals and consequently disable communication. For example, Lane 7 signals may initially be routed to Fiber(s) 8. If Fiber(s) 8 experiences a fault, a switch within the multiplexer may be opened to disengage a communication pathway between Lane 7 signals and Fiber(s) 8.

In an example illustration, at a first time an initial routing connection may be made between Lane signal 0 and fiber 1 such that fiber 1 houses lane 0 lane signals. During the initial routing, although a connection is made between Lane 0 and fiber 1, various channels may be subsequently opened via the demultiplexer 606H to any one of the multiplexers 608 in case a fault is later detected and Lane 0 needs to be re-routed to other fibers. During initial routing, multiplexer 608H may receive various inputs from all of the lane signals 601 and a hypervisor or other system firmware (e.g., hypervisor 322 of FIG. 3) may select fiber 1 as the output. Accordingly, during initial routing lane 0 signals may be housed within fiber 1. At a second time, a fault detection module within a second fiber connector at a receiving end of the PCIe link 216 may determine that there is a fault with fiber 1. Accordingly, the fiber connector 604 may be at a first end of the link transmitting the lane signals 601 and receiving a second set of lane signals transmitted from an opposite second end of the link. Therefore, for the second set of lane signals, fault detection module 620 may be utilized to determine whether there is a fault with particular signal carriers that correspond with the second set of lane signals. However, a second fault detection module may be included within a second fiber connector at the opposite second end of the PCIe link 216 to determine that there is a fault with fiber 1 when it is used to transmit one of the shown lane signals 601. Using the illustration above, the hypervisor (or other system firmware) may configure the demultiplexer 606H and multiplexer 608H to isolate lane 0 signals from fiber 1 to disable the fiber 1. The hypervisor or other system firmware may then configure demultiplexer 606H to re-route lane 0 to fiber 2 by routing lane 0 to mux 608G.

In some embodiments, circuit configurations other than those illustrated in FIG. 6 may be responsible for the routing of lane signals from faulty signal carriers to healthy signal carriers. For example, only a set of multiplexers 608 may be utilized without demultiplexers 606.

For example, each of the fibers 1-8 may include 8 multiplexers that have 8 input pins, 3 select input (control) pins, and one output pin. In an example illustration, fiber 1 may include a multiplexer that has 8 input pins that receive 8 inputs from 8 lanes (lanes 0-7). Accordingly, the hypervisor may configure the fiber 1 multiplexer to select which of the lane signals will be routed to fiber 1. If a fault is detected with fiber 1, fiber 2 may also include a corresponding multiplexer, which may then receive Lane 0 signals and output lane 0 to fiber 2.

In some embodiments, additional demultiplexers may be utilized within or near a downstream endpoint. For example, the link 216 may be connected to two endpoints. The transmitting endpoint may be PCIe endpoint 602 and a second endpoint may be the receiving endpoint. If a routing of lane signals of faulty signal carriers to healthy signals has occurred according to FIG. 6, the second endpoint may be unaware of the routing. Accordingly, a demultiplexer may be utilized to synchronize the routing. For example, the lane 0 signals may have been originally routed to fiber 1 before a fault was detected. Consequently, the second endpoint and associated second fiber connector may maintain this original routing sequence (lane 0 to fiber 1). When a fault occurs, a hypervisor or other system firmware may reroute the lane 0 signals from fiber 1 to fiber 2 at the interface between the PCIe endpoint 602 and the fiber connector 604. Accordingly, the second endpoint may still be configured to route the lane 0 signals to fiber 1. Therefore, the second endpoint may include a demultiplexer configured to route lane 0 signals to fiber 2.

FIG. 7A is an illustration of a faulty PCIe environment, and how the configuration of each signal may occur after various faults have been detected, according to embodiments. FIG. 7A illustrates an initial x8 link width in a PCIe environment (i.e., there are 8 lanes (0-7)). There are also 8 corresponding fibers (or groups of fibers), a column of demultiplexer values (Demux val), and a column of multiplexer values (Mux val). FIG. 7A illustrates that four fibers have become faulty or broken—fibers 1, 2, 5, and 8—and four fibers remain are healthy—fibers 3, 4, 6, and 7. In embodiments, the two columns of multiplexer and demultiplexer values may correspond to hypervisor logic to enable the routing of lane signals from faulty signal carriers to healthy signal carriers. FIG. 7A illustrates that the hypervisor or other system firmware logic values are represented as decimal values, which correspond to the actual binary codes that the hypervisor will write into select registers of the multiplexers or demultiplexers. For example, according to FIG. 7A, lane 2 includes a mux (decimal) value of 2 and demux (decimal) value of 6. Accordingly, the code 00000110 may cause the demultiplexer (e.g., demultiplexer 606F) that corresponds to lane 2 to rout lane 2 signals to fiber 6.

Figure 7B:
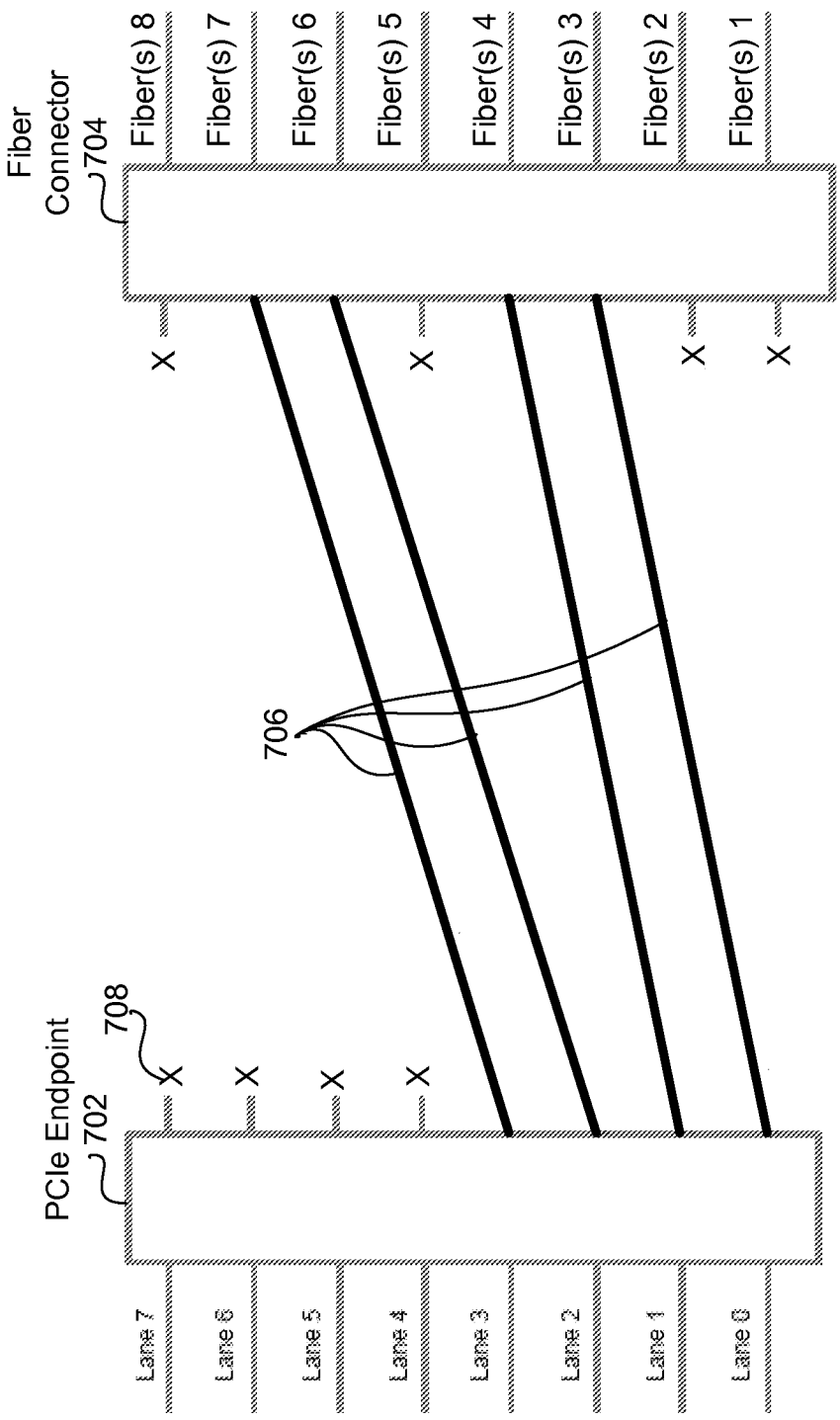
FIG. 7B is a diagram of the faulty PCIe environment of FIG. 7A, illustrating how each of the healthy signal carriers may be utilized to receive re-routed lane signals.

The demux values illustrated in FIG. 7A may accordingly represent the output value on the demultiplexer or the healthy fiber that needs to be selected for the routing (e.g., lane 1's demux value of 4 corresponds to selecting fiber 4 for routing as specified by the optical fibers column). The mux values of FIG. 7A may represent the select inputs of the multiplexer or the lane signals that need to be routed (e.g., for lane 3, the mux select value is 3). The Lanes for FIG. 7A (& FIG. 7B) may initially be routed (before fault occurs) to default settings (e.g., Lane 0 to Fiber 1, Lane 1 to Fiber 2, Lane 2 to Fiber 3, etc.).

FIG. 7B is a diagram of the faulty PCIe environment of FIG. 7A, illustrating how each of the healthy signal carriers may be utilized to receive re-routed lane signals. FIG. 7B illustrates a PCIe endpoint 702 and corresponding lanes (Lanes 0-7), whether a particular lane is re-routed 706 or not-rerouted 708 (shown by the X), a fiber connector 704, and corresponding fibers 1-8 (or groups of fibers). FIG. 7B illustrates that the link width may improve from an x0 (because fiber 1 became faulty, initially routed to lane 0 per pre-fault configuration) to an x4 link width. For example, Lane 0 may be re-routed to fiber 3, lane 1 may be re-routed to fiber 4, lane 2 may be re-routed to fiber 6, and lane 3 may be re-routed to fiber 7. Therefore, each of the existing healthy fibers may be utilized to increase the link width.

What is claimed is:

1. A computer-implemented method for routing lane signals from faulty signal carriers to healthy signal carriers to increase to a highest available bandwidth, the method comprising:
routing a plurality of lane signals through a plurality of signal carriers;
in response to the routing, opening, via a first demultiplexer, a plurality of communication channels from a first set of lane signals of the plurality of lane signals, to each of a plurality of multiplexers, the each of the plurality of multiplexers being assigned to a particular set of the plurality of signal carriers, wherein the first set of lane signals have a capability to be re-routed to any of the plurality of signal carriers upon a fault associated with a first set of signal carriers;
determining that the first set of signal carriers of the plurality of signal carriers are faulty, the first set of signal carriers for transmitting or receiving the first set of lane signals of the plurality of lane signals, the plurality of signal carriers forming a plurality of sequentially ordered lanes, the plurality of lanes comprising a link for use in intercommunication between two or more endpoints of a computing device;
identifying a second set of signal carriers of the plurality of signal carriers that are not faulty, the second set of signal carriers for transmitting a second set of lane signals of the plurality of lane signals; and
re-routing, based on the determining and identifying, one or more of the first set of lane signals from the first set of signal carriers through a first subset of the second set of signal carriers, wherein a first channel of the plurality of communication channels from the first demultiplexer to a first multiplexer is selected for the re-routing, the first multiplexer being assigned to the first subset of the second set of signal carriers, the routing of the one or more of the first set of lane signals causing a bandwidth capacity to increase to a highest available bandwidth.

2. The method of claim 1, further comprising routing one or more of the second set of lane signals from the first subset through a second subset of the second set of signal carriers.

3. The method of claim 1, wherein the determining that the first set of signal carriers of the plurality of signal carriers are faulty includes determining that the first set of lane signals are below a signal strength threshold, wherein the first set of lane signals are optical signals, and wherein a receiving end cable fiber connector includes a phototransducer to convert the optical signals into electrical signals, the electrical signals are measured in volts to determine whether the first set of lane signals are below a signal strength voltage threshold.

4. The method of claim 3, wherein a fault detection module within a cable connector apparatus performs the determining that the first set of lane signals are below the signal strength threshold, the cable connector coupled to a cable, the cable housing the plurality of signal carriers.

5. The method of claim 1, wherein the plurality of signal carriers are a plurality of optical fibers.

6. The method of claim 5, wherein the plurality of optical fibers are connected to an input/output (I/O) drawer at a first end and the plurality of optical fibers are connected to a root complex at a second end, the I/O drawer including a plurality of stacked endpoints, the I/O drawer further includes a hot plug adaptor to add or remove components, the I/O drawer further includes a hot swap disk bay to allow for removal of a drive without shutting a computing system down, wherein the root complex is for use in generating a request on behalf of a processor of the computing device.

7. A computer-implemented method for routing lane signals from faulty signal carriers to healthy signal carriers to increase to a highest available bandwidth, the method comprising:
configuring multiplexer and demultiplexer values to route a plurality of optical lane signals through a plurality of optical signal carriers, the plurality of optical signal carriers being an entire full set of optical signal carriers in a PCIe system;
determining that a first set of optical signal carriers of the plurality of optical signal carriers are faulty, the first set of optical signal carriers for transmitting or receiving a first set of respective optical lane signals of the plurality of lane signals, the plurality of optical signal carriers forming a plurality of sequentially ordered lanes, the plurality of lanes comprising a link for use in intercommunication between two or more endpoints of a computing device, at a first time the computing device is configured to lose all communication via the link at a x0 link width in response to ah fault at lane 0;
disabling, in response to the determining and by a first demultiplexer, the first set of optical signal carriers, the first demultiplexer being included with a plurality of demultiplexers, each of the plurality of demultiplexers being assigned to a distinct lane of the plurality of sequentially ordered lanes;
identifying a second set of optical signal carriers of the plurality of optical signal carriers that are not faulty, the second set of optical signal carriers for transmitting a second set of optical lane signals of the plurality of optical lane signals;
changing, in response to the disabling and identifying, the configuring of the multiplexer and demultiplexer values;

routing, based on the changing and by a first multiplexer, one or more of the first set of optical lane signals from the first set of optical signal carriers through a first subset of the second set of optical signal carriers, the routing of the one or more of the first set of optical lane signals causing a bandwidth capacity to increase to a highest available bandwidth, wherein the first multiplexer is included with plurality of multiplexers, and wherein each of the plurality of multiplexers are assigned to a distinct optical signal carrier of the plurality of optical signal carriers, at a second time and in response to the routing, the computing device is configured to increase a link width greater than or equal to x4 in response to another fault at lane 0, the second time being subsequent to the first time; and link training, automatically triggered by an error condition notification associated with the determining that the first set of optical signal carriers are faulty , the link training includes determining system parameters including: link width, link polarity, link number, and lane number.

\* \* \* \* \*